US 7,929,868 B2

(12) United States Patent
Reinhardt et al.

(10) Patent No.: US 7,929,868 B2
(45) Date of Patent: Apr. 19, 2011

(54) INFRARED RECEIVER, INFRARED BRIDGE DEVICE AND METHODS FOR USE THEREWITH

(75) Inventors: Glenn Reinhardt, Austin, TX (US); Antonio Torrini, Austin, TX (US); William Hong, Austin, TX (US)

(73) Assignee: Sigmatel, Inc., Austin, TX (US)

( * ) Notice: Subject to any disclaimer, the term of this patent is extended or adjusted under 35 U.S.C. 154(b) by 1176 days.

(21) Appl. No.: 11/472,034

(22) Filed: Jun. 21, 2006

(65) Prior Publication Data

US 2007/0297811 A1    Dec. 27, 2007

(51) Int. Cl.
*H04B 10/06*    (2006.01)

(52) U.S. Cl. ........................................... 398/202

(58) Field of Classification Search ........... 398/202–214
See application file for complete search history.

(56) References Cited

U.S. PATENT DOCUMENTS

| | | | |
|---|---|---|---|
| 5,546,211 A * | 8/1996 | Devon | 398/98 |
| 6,281,880 B1 * | 8/2001 | Rose et al. | 345/158 |
| 6,798,850 B1 * | 9/2004 | Wedin et al. | 375/340 |
| 6,826,371 B1 * | 11/2004 | Bauch et al. | 398/188 |
| 7,139,488 B1 * | 11/2006 | Mituhashi | 398/129 |
| 2002/0135845 A1 * | 9/2002 | Robinson et al. | 359/189 |
| 2004/0264600 A1 * | 12/2004 | Kao et al. | 375/316 |
| 2008/0317182 A1 * | 12/2008 | Zhang et al. | 375/355 |

* cited by examiner

*Primary Examiner* — Shi K Li (57) ABSTRACT

An infrared data receiver includes an infrared detector for generating a received signal from an infrared input signal. A sampling module generates a sequence of sampled data from the received signal. A plurality of processing modules are included, wherein each processing module is capable of detecting and decoding data in at least one of a plurality of data formats. Each processing module analyzes the sequence of sampled data for its particular data formats. When a processing module detects one of its data formats, it generates a detection signal and decodes the sequence of sampled data into decoded data. A controller module receives the detection signal from one of the plurality of processing module, and disables the other ones of the plurality processing modules.

6 Claims, 8 Drawing Sheets

INFRARED RECEIVER, INFRARED BRIDGE DEVICE AND METHODS FOR USE THEREWITH

BACKGROUND OF THE INVENTION

1. Technical Field of the Invention

The present invention relates to infrared data receivers, infrared bridge devices and related methods.

2. Description of Related Art

As is known, Infrared Data Association (IrDA) standards set forth specifications for data communication protocols used to transmit data over a short range using an infrared link. Such IrDA compatible links are used in a wide variety of electronic equipment, including personal digital assistants (PDA), computers, printers, MP3 players, and cameras. In addition, IrDA compatible bridge devices can be purchased coupled to an existing device port, such as a Universal Serial Bus (USB) port to provide an IrDA compatible links to devices that are not otherwise equipped.

The IrDA standards allow for communication at transmission speeds that range from 2.4 kbits/sec to 100 Mbits/sec or higher using a variety different data formats that vary based on the particular data rate. When a communication link is established, devices begin communicating at the 9.6 kbits/sec speed and then, typically, negotiate the switch to a higher data rate and the corresponding data format that corresponds to that data rate. Establishment of the IrDA compatible link is simplified by the use of a single data rate and data format during the initial phase of communication.

If however, a link has already been established between existing devices and a new device wishes to monitor the link, the situation is greatly complicated because the existing devices can be communicating in a plurality of data rates and a plurality of data formats.

DETAILED DESCRIPTION OF THE INVENTION INCLUDING THE PRESENTLY PREFERRED EMBODIMENTS

Various embodiments of the present invention include an infrared receiver and infrared bridge device that are capable of detecting, monitoring, and/or joining a pre-established infrared communications link. This advantage and other advantages over the prior art will be evident in light of the many functions and features described herein.

Figure 1:
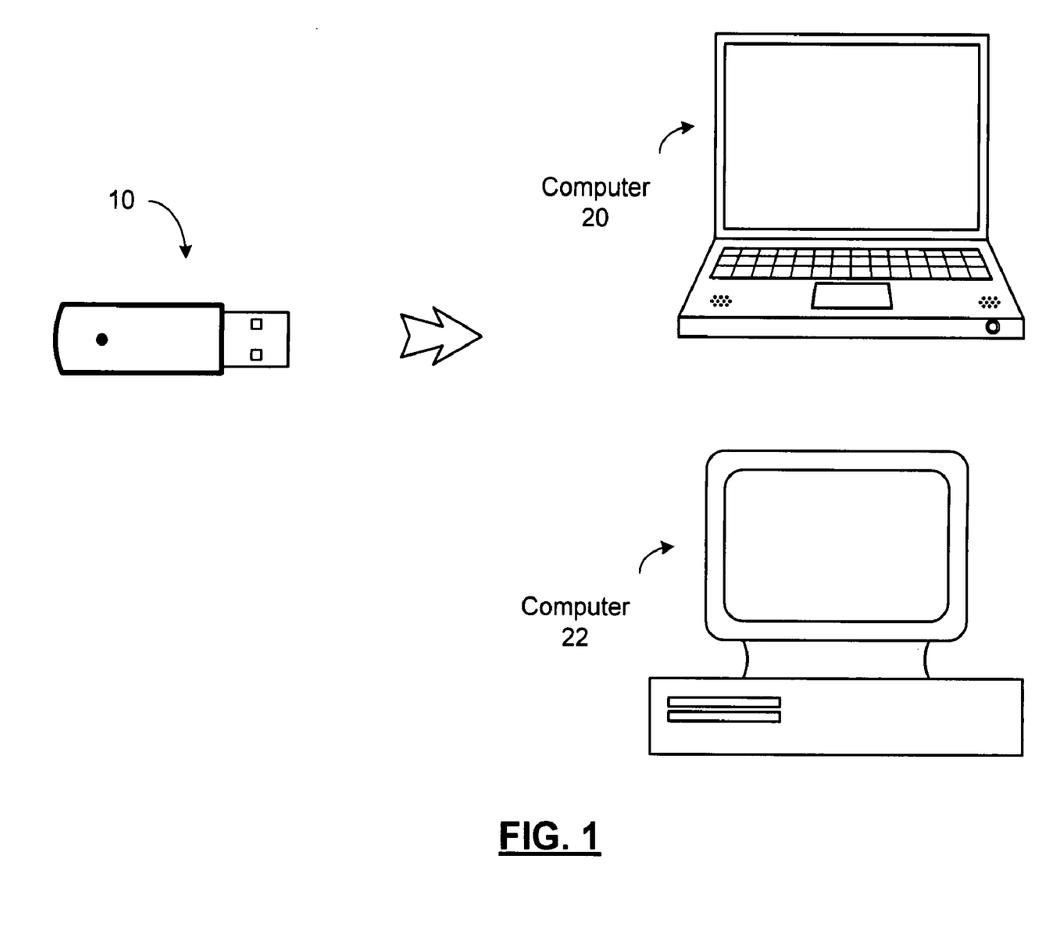
FIG. 1 presents pictorial diagram representation of an infrared bridge device in accordance with an embodiment of the present invention.

FIG. 1 presents pictorial diagram representation of an infrared bridge device in accordance with an embodiment of the present invention. In particular, infrared bridge device 10 includes a USB client interface that allows the infrared bridge device to be coupled to the USB port of client devices such as computer 20 or computer 22. Infrared bridge device 10 includes an infrared receiver with one or more novel features in accordance with the present invention, as will be described in greater detail in conjunction with the description and claims that follow.

Figure 2:
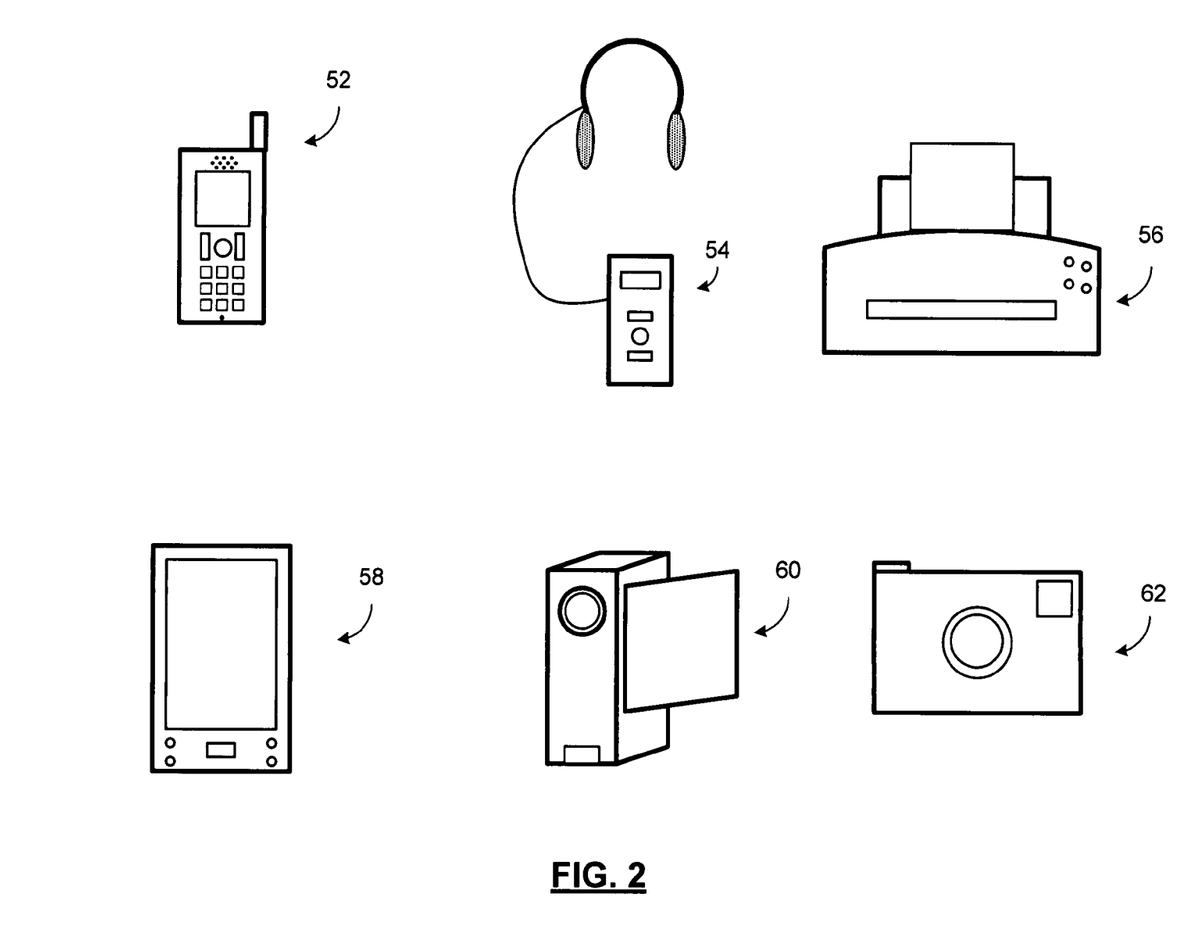
FIG. 2 presents pictorial diagrams of various infrared compatible electronic devices in accordance with an embodiment of the present invention.

FIG. 2 presents pictorial diagrams of various infrared compatible electronic devices in accordance with an embodiment of the present invention. In particular, wireless telephone 52, handheld audio device 54, printer 56, PDA 58, digital camcorder 60 and digital camera 62, provide examples of the wide range of client devices that can include either an integrated infrared communications receiver or integrated bridge device in accordance with an embodiment of the present invention.

Figure 3:
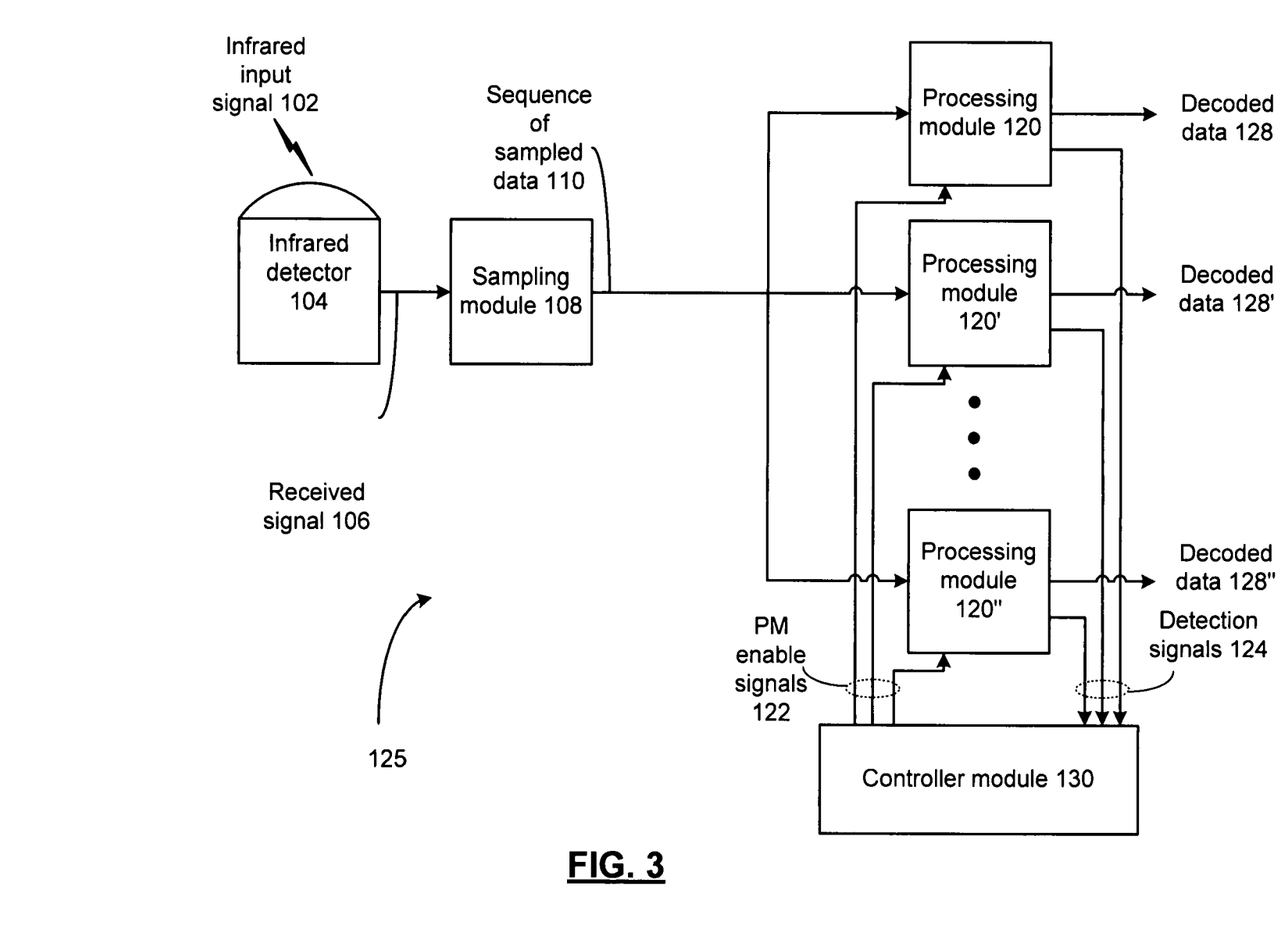
FIG. 3 presents a schematic/block diagram representation of an infrared receiver in accordance with an embodiment of the present invention.

FIG. 3 presents a schematic/block diagram representation of an infrared receiver in accordance with an embodiment of the present invention. In particular, an infrared receiver 125 is presented that may be used as described in conjunction with FIGS. 1 and 2. Infrared data receiver 125 includes an infrared detector 104 for generating a received signal 106 from an infrared input signal 102. In an embodiment of the present invention, the infrared input signal 102 is a modulated signal that has a carrier in the infrared portion of the electromagnetic spectrum. Infrared detector 104 includes a detection device such as a charge coupled device, photo resistor, phototransistor or other photosensitive device that demodulates the infrared input signal 102 into an electronic signal that can be optionally amplified and filtered to produce received signal 106.

A sampling module 108 generates a sequence of sampled data 110 from the received signal 106. A plurality of processing modules 120, 120', 120", etc. are included, wherein each processing module is capable of detecting and decoding data in a different one of a plurality of data formats. Each processing module 120, 120', 120", analyzes the sequence of sampled data for its particular data format. When a processing module detects its data format, it generates a detection signal 124 and decodes the sequence of sampled data 122 into decoded data 128, 128' or 128". In an embodiment of the present invention, controller module 130 receives the detection signal 124 from the processing module 120, 120', 120" that detected its data format, and disables the other processing modules by deasserting their corresponding processing module enable signals 122.

In an embodiment of the present invention, the processing modules 120, 120' and 120" each include a dedicated state machine that is configured to detect and decode data in either a serial infrared (SIR) data format, a medium infrared (MIR) data format, a fast infrared (FIR) data format, an very fast infrared (VFIR) or ultra fast infrared (UFIR) data format in accordance with the IrDA standards. One or more of the data formats can operate at different data rates. For instance, there are five standard data rates currently used in the SIR data format and two standard data rates for the MIR data format. Consequently, one or more of the dedicated state machines is further operable to detect the particular data rate employed by the existing link, and incorporate this detected data rate in the detection signal 124 provided to controller module 130.

While the description above has focused on processing modules 120, 120' and 120" each supporting a single data format, in addition, one or more of the processing modules 120, 120' and/or 120" can optionally support multiple data formats. In this fashion, at least one of the plurality of processing modules 120, 120' and/or 120" analyzes the sequence of sampled data 110 for at least two of the plurality of data formats, and when one these data formats is detected, the processing module generates a detection signal 124 that indicates the detected data format (and optionally the data rate) and decodes the sequence of sampled data 110 into decoded data 128, 128' or 128" based on the detected data format. For instance, a dedicated state machine can be employed for the SIR, MIR and UFIR formats, however, a single state machine could be used to detect and decode both the FIR and VFIR data formats. Similarly, other combinations are likewise possible within the broad scope of the present invention.

In operation, infrared receiver 125 may be exposed to an infrared input signal 102 that corresponds to a pre-established communications link. Sampling module 108 generates the sequence of sampled data 110 from received signal 106 at a very high sample rate, so as to capture data at the highest possible data rate. Controller module 130 asserts all of the processing module enable signals 122 and each processing module analyzes the sequence of sampled data in attempt, such as by detecting the timing of bit transitions, searching for periodic frame data or other periodic data, to detect the data rate and lock in on the sequence of sampled data 110 with its own format. The processing module 120, 120', 120" that has the data format and a data rate that corresponds to the data format of the infrared input signal should achieve lock. In response, this particular processing module asserts its respective detection signal 124.

In an embodiment of the present invention, controller module 130 includes a digital processor that launches an interrupt service routine in response to the assertion of detection signal 124 from one of the processing modules 120, 120', 120", etc. Controller module 130, determines which of the processing modules 120, 120', and 120" generated the interrupt, and disables the remaining processing modules by deasserting their corresponding processing module enable signals 122. The processing module that remains enabled, decodes the sequence of sampled data into decoded data 128, 128' or 128" from the corresponding format and at the corresponding data rate.

While processing modules 120, 120' 120", etc. have been described as state machines and controller module 130 has been described as a digital processor, in alternative embodiments, these devices can be implemented using a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory may include a single memory device or a plurality of memory devices. Such a memory device may be a read-only memory, random access memory, volatile memory, non-volatile memory, static memory, dynamic memory, flash memory, cache memory, and/or any device that stores digital information. Note that when the processing module modules 120, 120', 120" and/or controller module 130 implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry.

Figure 4:
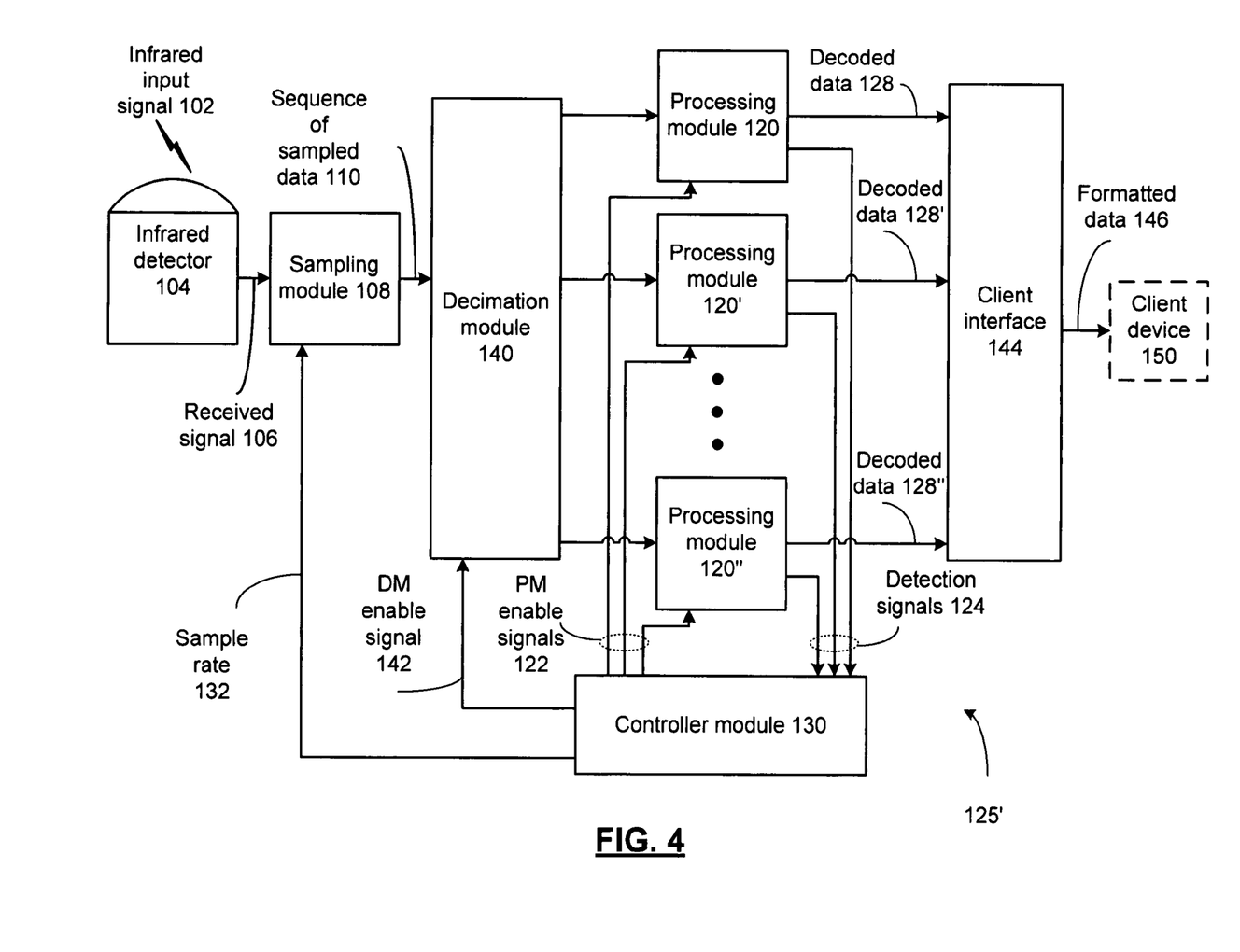
FIG. 4 presents a schematic/block diagram representation of an infrared receiver in accordance with an embodiment of the present invention.

FIG. 4 presents a schematic/block diagram representation of an infrared receiver in accordance with an embodiment of the present invention. In particular, an infrared receiver 125' is presented that may be used in as described in conjunction with FIGS. 1 and 2. Infrared receiver 125' includes similar elements of infrared receiver 125 that are referred to by common reference numerals. However, infrared receiver 125' further includes a sampling module 108 that generates the sequence of sampled data 110 at a sample rate 132 that is set by controller module 130. In an embodiment, controller module 130, sets sample rate 132 at a first sample rate, such as a sample rate sufficient to sample the highest possible data rate, before one of the plurality of data formats is detected. After one of the plurality of data formats is detected and a corresponding data rate is detected, controller module 130 sets sample rate 132 to second sample rate, such as a sample rate 132 that is based on the particular data format and data rate that was detected.

Infrared receiver 125' further includes decimation module 140 that decimates the sequence of sampled data 110 for one or more of the processing modules 120, 120' and 120" when enabled by controller module 130. In an embodiment of the present invention, decimation module 140 includes a plurality of downsampling filters. As discussed above, before one of the plurality of data formats is detected, the sampling module 108' is set to a first sample rate. The processing module 120, 120' or 120", etc. that is configured to analyze that data rate can be set at a low decimation factor, such as 1. The remaining processing modules are decimated at different decimation factors to down-sample the sequence of sampled data 110 to data rates within range of each processing module's corresponding data rate. After the sample rate 132 is set by controller 130, based on the particular data format and data rate that was detected, decimation module 140 can be disabled by controller module 130 by deasserting decimation module enable signal 142.

In addition, client interface 144 converts decoded data 128, 128' or 128" from one of the processing modules 120, 120' or 120" into formatted data 126 in the data format of a client device 150. In an embodiment of the present invention, infrared receiver 125' is implemented as part of an infrared bridge device that is coupled to a client device 150 via a port such as a USB port, Institute for Electrical and Electronics Engineers (IEEE) 488 port, RS 232 port, IEEE 1394 or Firewire port, Ethernet port, or communications port, either standard or proprietary. In an alternative embodiment, infrared receiver 125' is integrated directly in the client device, such as wireless telephone 52, handheld audio device 54, printer 56, PDA 58, digital camcorder 60 and digital camera 62, or other electronic device that includes an integrated infrared receiver.

The operation of infrared receiver 125', in accordance with an embodiment of the present invention, can be further illustrated by the following example. Assume that the infrared receiver 125' wishes to monitor a pre-established communications link that is using an FIR data rate and data format. Further assume that infrared receiver 125' include four processing modules 120, 120', 120", etc. that are configured, one each for the SIR, MIR, FIR and VFIR data rates and formats.

Controller module 130 initially sets the sampling rate 132, such as to adequately sample a possible 16 Mbits/sec VFIR data stream. Controller 130 enables decimation module 140 by asserting the decimation module enable signal 142. Decimation module passes the sequence of sampled data 110 to the VFIR processing module, it decimates the sequence of sampled data 110 by a decimation factor of 4 for the FIR processing module, it decimates the sequence of sampled data 110 by a decimation factor of 16 for the MIR processing module, and decimates the sequence of sampled data 110 by a decimation factor of 128 for the SIR processing module. Controller 130 also enables each of the four processing modules to analyze their respective input data streams. The FIR processing module achieves lock and generates its corresponding detection signal, 124.

Controller module 130, determines that the detection signal 124 was generated by the FIR processor. Controller module 132 modifies the sample rate 132 to correspond to a slower sample rate, adequate for the 4 Mbit/sec FIR data rate. Controller module 130 deasserts the processing module enable signals 122 for the SIR, MIR, and VFIR processing modules and deasserts the decimation module enable signal 142. The FIR processing module operates to generate decoded data 128, 128' or 128" that is formatted by client interface 144 into formatted data 146 in the format of client device 150.

While the descriptions of the embodiments of FIGS. 3 and 4 have focused on acquisition of an existing link, in an embodiment of the present invention, the methods and apparatus described herein can likewise be applied to the reacquisition of a link where lock was lost. In this instance, controller module 130 asserts processing module enable signals 122 to enable each of the processing modules 120, 120' and 120", sets the sample rate 132 of sampling module 108 at the first sample rate, asserts the decimation module enable signal 142, etc, to begin again.

In addition, while the foregoing description has focused on a sniffer application that is capable of monitoring the data transmitted over an existing link, the present invention could likewise be implemented in a system having data formats that are compatible with multiple access that allows a new entrant to join a pre-existing link.

Figure 5:
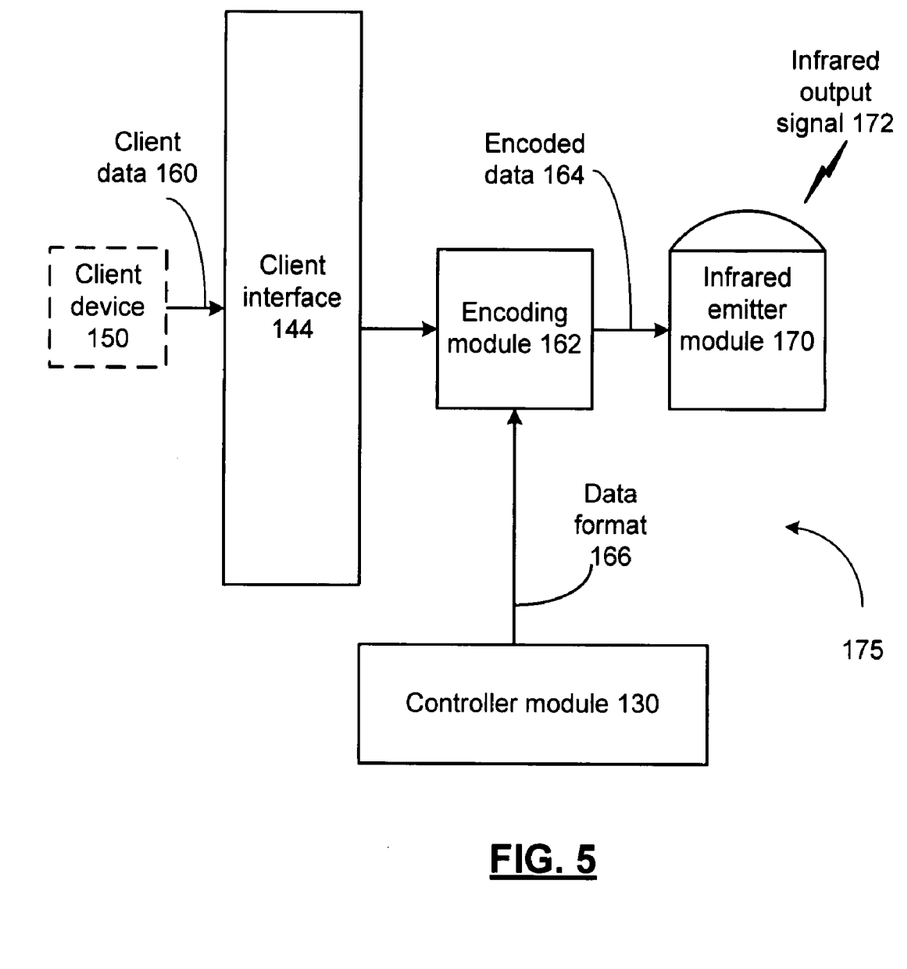
FIG. 5 presents a schematic/block diagram representation of an infrared transmitter in accordance with an embodiment of the present invention.

FIG. 5 presents a schematic/block diagram representation of an infrared transmitter in accordance with an embodiment of the present invention. An infrared transmitter section 175 is presented for use with infrared transceivers 125 and/or 125' to facilitate bidirectional communication once the data rate and data format are established by infrared receiver 125 and/or 125'. Client interface 144 is further operable to receive client data 160 in the client device format from the client device 150. Encoding module 162 encodes the client data 160 into encoded data 164 in the detected data format 166, received from controller module 130. Infrared emitter module 170 converts the encoded data into an infrared output signal 172.

In an embodiment of the present invention, infrared emitter module 170 includes a light emitting diode, laser diode or other photo-emitting device that is capable of producing a modulated output within the infrared portion of the electromagnetic spectrum. Encoding module 162 can be implemented using a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory may include a single memory device or a plurality of memory devices. Such a memory device may be a read-only memory, random access memory, volatile memory, non-volatile memory, static memory, dynamic memory, flash memory, cache memory, and/or any device that stores digital information. Note that when the encoding module 162 implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry.

Figure 6:
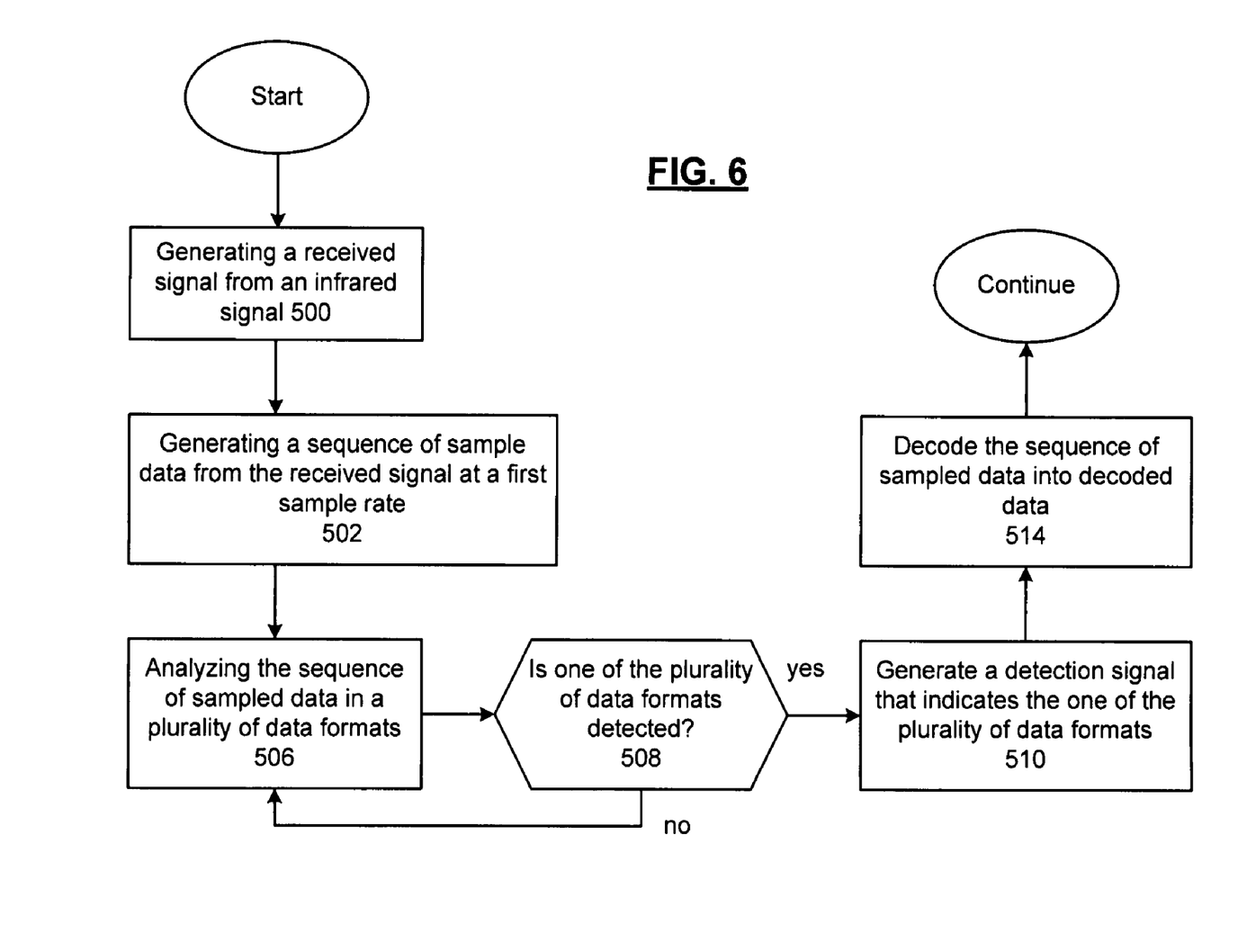
FIG. 6 presents a flowchart representation of a method in accordance with an embodiment of the present invention.

FIG. 6 presents a flowchart representation of a method in accordance with an embodiment of the present invention. In particular, a method is presented for use with one or more of the features and functions described in association with FIGS. 1-5. In step 500, a received signal is generated from an infrared input signal. In step 502, a sequence of sampled data is generated from the received signal at a first sample rate. In step 506, the sequence of sampled data is analyzed in a plurality of data formats. In step 508, the method determines if one of the plurality of data formats was detected. If not, the method continues to analyze the sequence of sampled data in step 506. If a data format is detected, a detection signal is generated that indicates the one of the plurality of data formats, as shown in step 510. In step 514, the sequence of sampled data is decoded into decoded data.

In an embodiment of the present invention, the plurality of data formats include at least one of: a serial infrared data format, a medium infrared data format, a fast infrared data format, a very fast infrared data format, and an ultra fast infrared data format.

Figure 7:
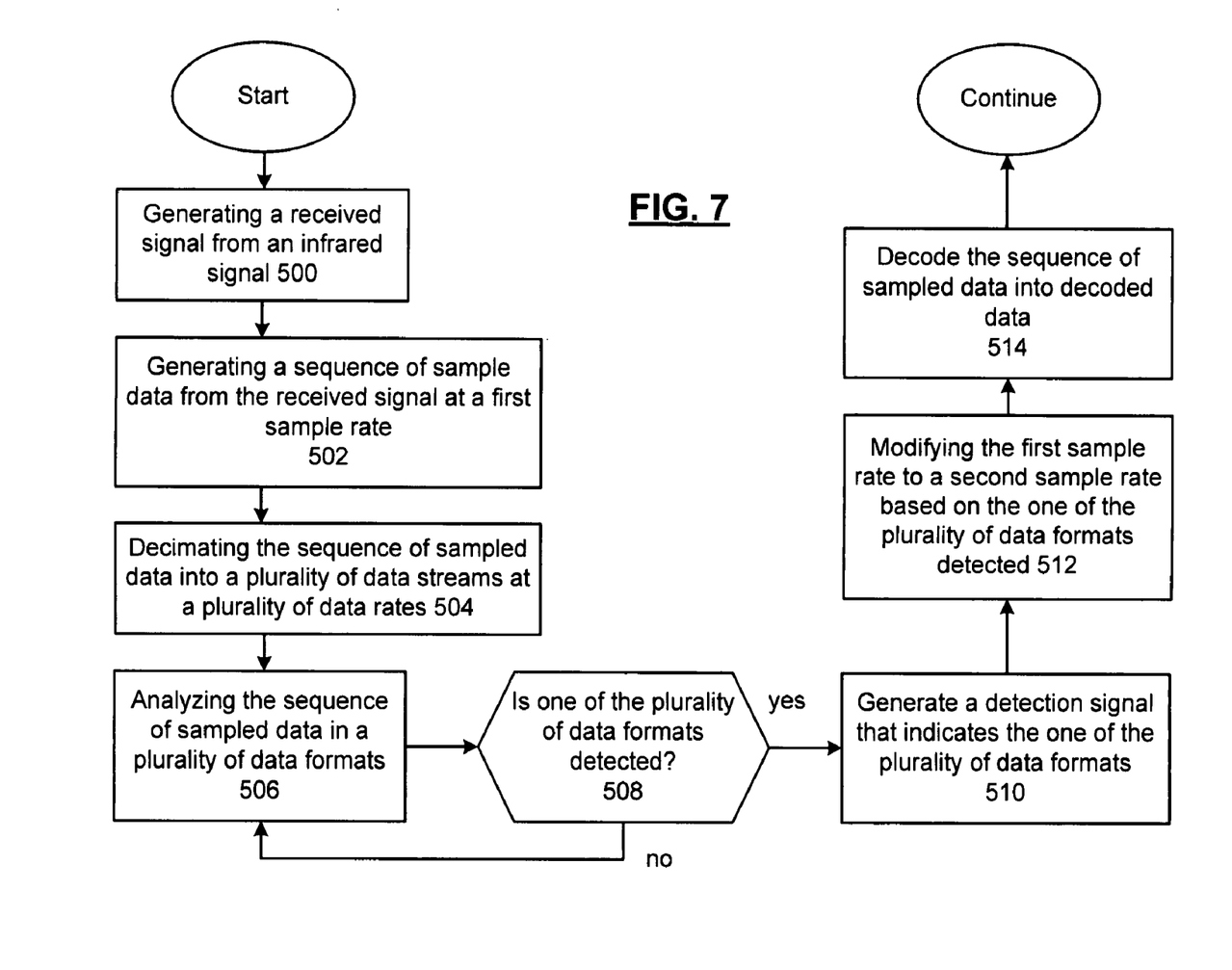
FIG. 7 presents a flowchart representation of a method in accordance with an embodiment of the present invention.

FIG. 7 presents a flowchart representation of a method in accordance with an embodiment of the present invention. A method is presented for use with one or more of the features and functions described in association with FIGS. 1-5. In particular, a method is presented that includes many common elements of the method of FIG. 6, that further includes step 504 of decimating the a sequence of sampled data into a plurality of data streams at a plurality of data rates, and step 512 of modifying the first sample rate to a second sample rate based on the one of the plurality of data formats. In an embodiment of the present invention, step 504 is disabled when the one of the plurality of data formats is detected.

Figure 8:
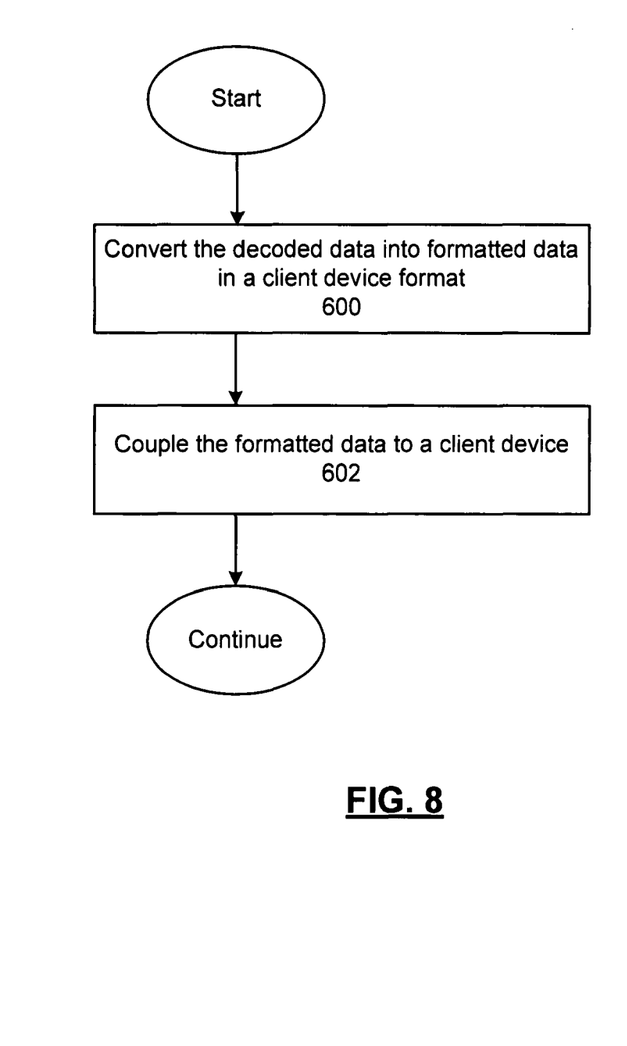
FIG. 8 presents a flowchart representation of a method in accordance with an embodiment of the present invention.

FIG. 8 presents a flowchart representation of a method in accordance with an embodiment of the present invention. In particular, a method is presented for use with one or more of the features and functions described in association with FIGS. 1-7. In step 600, the decoded data are converted into formatted data in a client device format. In step 602, the formatted data are coupled to a client device.

Figure 9:
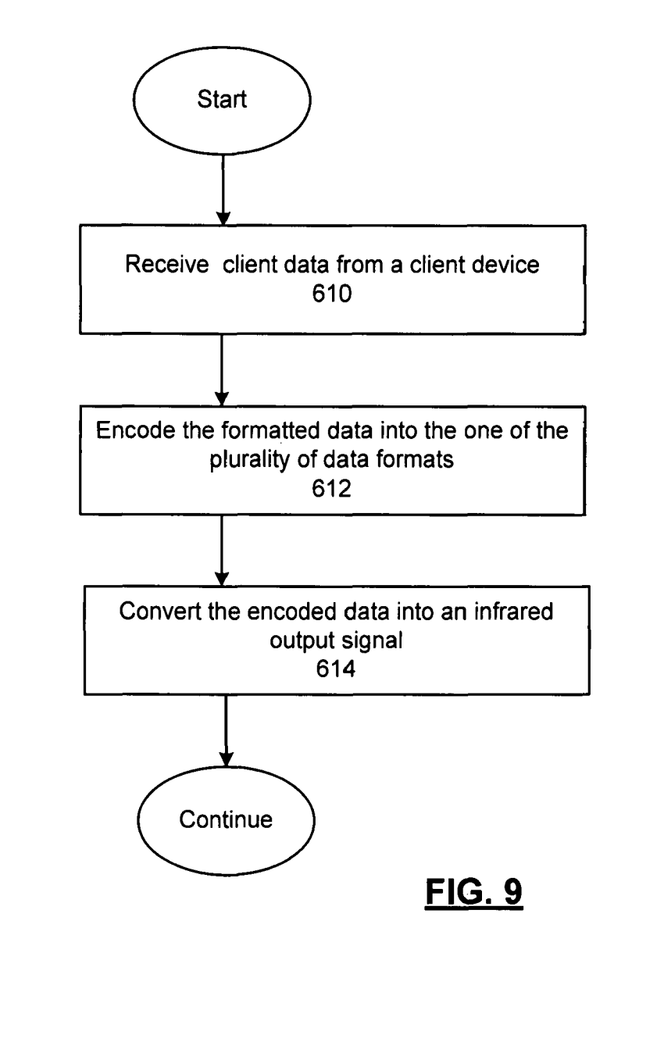
FIG. 9 presents a flowchart representation of a method in accordance with an embodiment of the present invention.

FIG. 9 presents a flowchart representation of a method in accordance with an embodiment of the present invention. In particular, a method is presented for use with one or more of the features and functions described in association with FIGS. 1-8. In step 610, client data are received from the client device. In step 612, the client data is encoded into encoded data in a particular one of the plurality of data formats—when the particular data format is detected. In step 614, the encoded data are converted into an infrared output signal.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled". As one of ordinary skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The various circuit components can be implemented using 0.35 micron or smaller CMOS technology. Provided however that other circuit technologies, both integrated or non-integrated, may be used within the broad scope of the present invention. Likewise, various embodiments described herein can also be implemented as software programs running on a computer processor. It should also be noted that the software implementations of the present invention can be stored on a tangible storage medium such as a magnetic or optical disk, read-only memory or random access memory and also be produced as an article of manufacture.

Thus, there has been described herein an apparatus and method, as well as several embodiments including a preferred embodiment, for implementing an infrared receiver and an infrared bridge device. Various embodiments of the present invention herein-described have features that distinguish the present invention from the prior art.

It will be apparent to those skilled in the art that the disclosed invention may be modified in numerous ways and may assume many embodiments other than the preferred forms specifically set out and described above. Accordingly, it is intended by the appended claims to cover all modifications of the invention which fall within the true spirit and scope of the invention.

What is claimed is:

1. A method comprising:
   generating at an infrared data receiver a received signal from an infrared input signal;
   generating at the infrared data receiver a sequence of sampled data from the received signal at a first sample rate;
   analyzing at the infrared data receiver the sequence of sampled data in a plurality of data formats; and
   when one of the plurality of data formats is detected:
   generating at the infrared data receiver a detection signal that indicates the one of the plurality of data formats; and
   decoding at the infrared data receiver the sequence of sampled data into decoded data; and
   modifying the first sample rate to a second sample rate based on the one of the plurality of data formats.

2. The method of claim 1 further comprising:
   decimating the sequence of sampled data into a plurality of data streams at a plurality of data rates.

3. The method of claim 2 wherein the step of decimating is disabled when the one of the plurality of data formats is detected.

4. The method of claim 1 wherein the plurality of data formats include at least one of: a serial infrared data format in accordance with Infrared Data Association (IrDA) standards, a medium infrared data format in accordance with IrDA standards, a fast infrared data format in accordance with IrDA standards, a very fast infrared data format in accordance with IrDA standards, and an ultra fast infrared data format in accordance with IrDA standards.

5. The method of claim 1 further comprising:
   converting the decoded data into formatted data in a client device format; and
   coupling the formatted data to a client device.

6. The method of claim 5 further comprising:
   receiving client data from the client device;
   when the one of the plurality of data formats is detected:
   encoding the client data into encoded data in the one of the plurality of data formats; and
   converting the encoded data into an infrared output signal.

* * * * *